United States Patent [19]

Kaplan

[11] 4,061,341

[45] Dec. 6, 1977

[54] SEPARATORS FOR SPACING RECORDS

[76] Inventor: Ricardo Gabriel Kaplan, Miranda 5237, 1407 Buenos Aires, Argentina

[21] Appl. No.: 716,328

[22] Filed: Aug. 20, 1976

[30] Foreign Application Priority Data

Aug. 29, 1975 Argentina .............................. 260194

[51] Int. Cl.$^2$ .............................................. G11B 3/00
[52] U.S. Cl. .................................. 274/1 R; 274/42 R
[58] Field of Search .............................. 274/1 R, 42 R

[56] References Cited

U.S. PATENT DOCUMENTS

| 2,806,704 | 9/1957 | Burdett | 274/42 |
| 3,540,737 | 11/1970 | Borthwick | 274/1 R |
| 3,854,729 | 12/1974 | Downs | 274/1 R |

*Primary Examiner*—Steven L. Stephan

*Attorney, Agent, or Firm*—Ladas, Parry, Von Gehr, Goldsmith & Deschamps

[57] ABSTRACT

A separator for spacing records in a stack comprises a thin metal plate provided with a central hole whose diameter is larger than the diameter of the central hole of the records and having a self-acting adhesive on one of its faces. The plate is adhesively attachable by means of the self-acting adhesive to one of the faces of a record, in the central zone thereof. An additional part of the separator is constituted by a central portion having a hole whose diameter is at least as great as the diameter of the central hole of the plate, a magnetic zone surrounding the hole, and peripheral portions defining elastic zones that extend over the surface of the additional part. In use, the additional part is magnetically adhered to the metal plate with its elastic zones facing away from the record.

7 Claims, 10 Drawing Figures

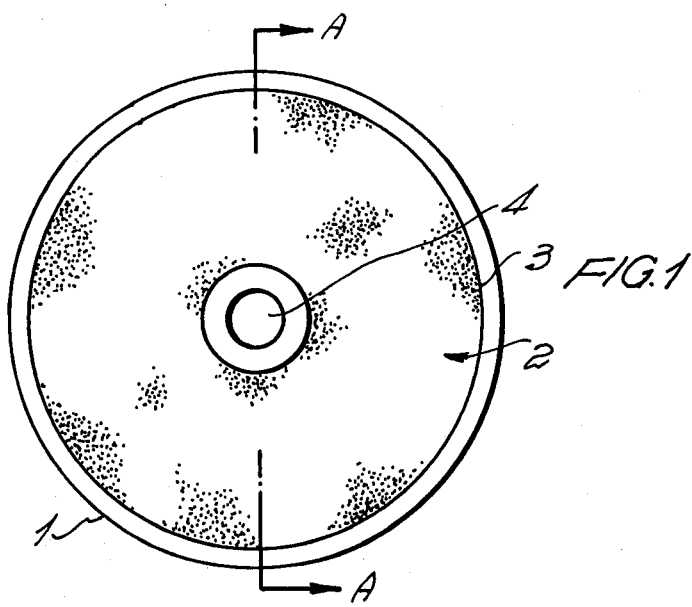
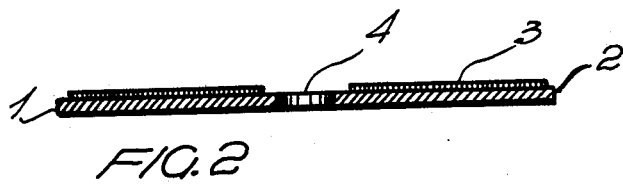
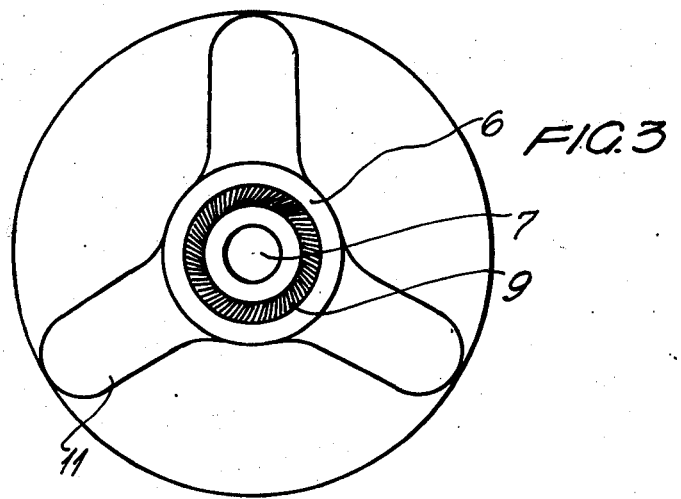

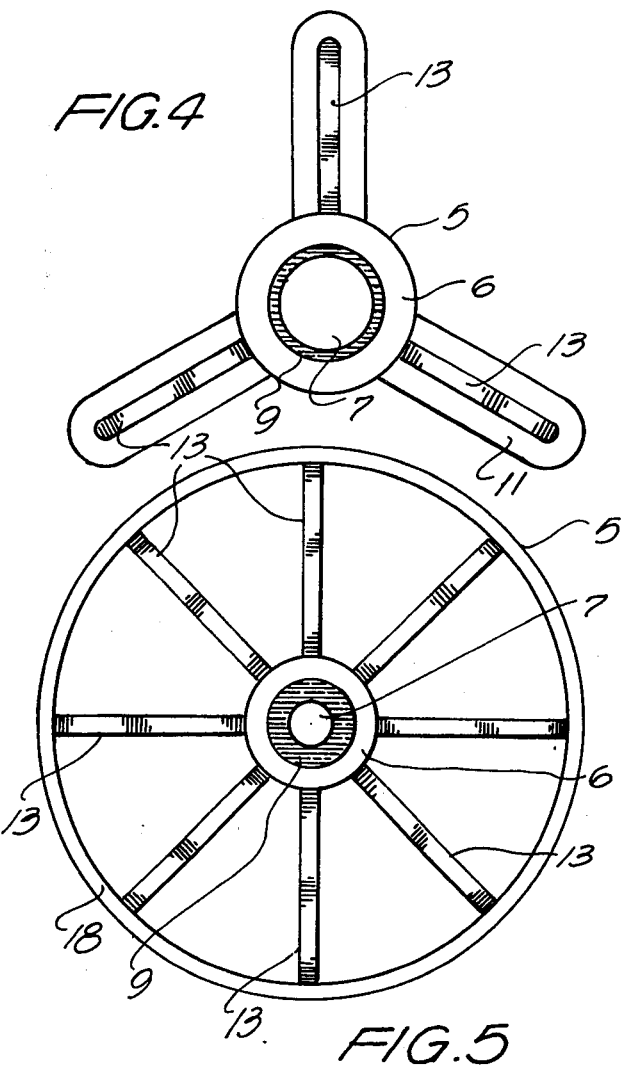

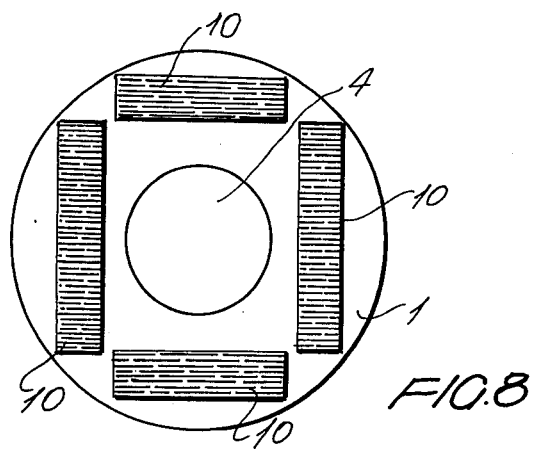
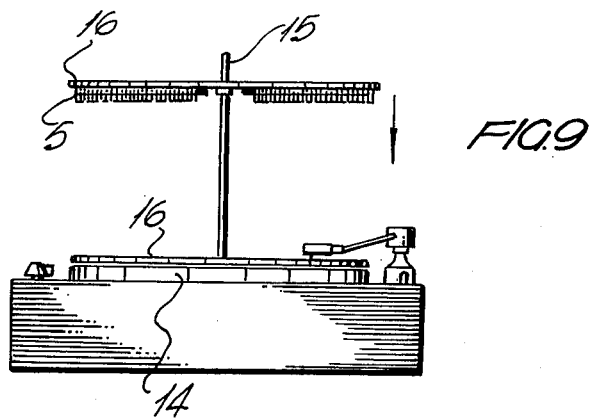
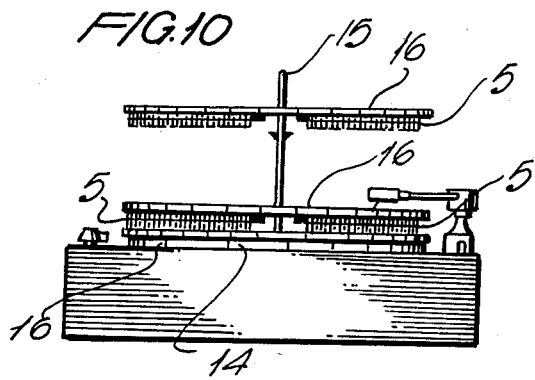

SEPARATORS FOR SPACING RECORDS

This invention relates to separators for spacing the records of a stack of records and its main object is to provide an assembly of elements which, applied to the records, permit the use of a record changer of automatic or semiautomatic type without damaging the records.

It is known that when a record changer of said type is used it is charged with a stack of records in mutual engagement, and when the record changer is operated the components of the stack fall on the turntable of the record changer and are being transferred to said turntable until forming on the same a stack similar to the previous one, in which the records continue to be in mutual engagement.

During the above described operation the records are exposed to impacts when falling as well as friction between them when the turntable rotates, suffering scratches which detract from the fidelity and purity of sound.

The main object of the invention is to provide a device for preventing the records from being damaged as explained, by means of a separator which must fulfill a series of conditions and which avoids direct contact between the records.

The separator must be able to attach itself to the record without disturbing the operation of the same or of the mechanism of the record changer; it also must be easy to instal as it is to be used by persons having no general experience in such things, and must not complicate the handling of the records as this would be contrary to the idea of using automatic record changers with a stack of records simply placed on the corresponding support.

These requirements are satisfied by the device of the invention which is essentially constituted by a thin metal plate provided with a central hole whose diameter is larger than that of the records, and a self-acting adhesive on one of its faces so as to adhere the separator with this face to the corresponding zone of the records, and by a part consisting of a central portion provided with a hole whose diameter is at least the same as that of the said plate, with a magnetic zone and with peripheric portions defining elastic zones projecting outwards from the surface of the part.

Said part is to remain in engagement with the record through its magnetic zone by means of the plate, bearing against the records with its elastic zones.

So that the invention may be easily understood and carried out, the annexed drawings show preferred embodiments of the same; in these drawings:

FIG. 1 is a top view of the thin metal plate of the device of this invention;

FIG. 2 is a section along line A—A of FIG. 1;

FIG. 3 is a top view of an embodiment of the part completing the device of the invention;

FIGS. 4 to 6 are top view of other embodiments of the part completing the device of the invention;

FIG. 8 is a detailed view of a possible shape of the magnetic zone of the part shown in FIGS. 2 to 6; and FIG. 9 and 10 are side elevations showing functional aspects of the invention.

Figure 6:
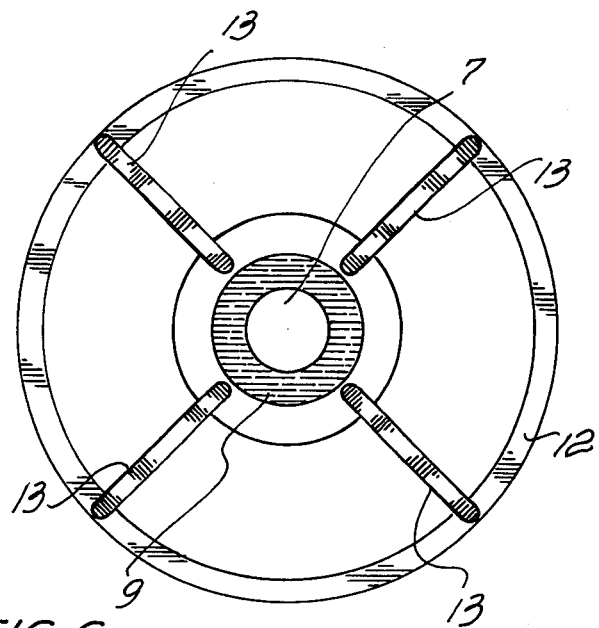

In all of the figures the same references indicate like or corresponding parts of the invention which comprises a plate 1 preferably having a circular circumference, made of metal, which on one of its faces, i.e. on face 2, carries a self-acting adhesive 3, and which has a central hole 4 whose diameter is larger than that of the hole normally present in records.

By means of the self-acting adhesive 3 the plate 1 may be attached to a record, with the hole 4 aligned with the hole in the record. As will be seen further on, the record may be one of a stack of records and therefore it will be necessary to attach a plate 1 to each of its two faces; of course, the thickness of the plate must be very small, of the order of about two tenths of a millimeter, which increases only very slightly the thickness of the records.

The separating unit is completed by a separating part 5 which has a central portion 6 and peripheric portions which, as the case may be, may have different shapes as shown in FIGS. 3 to 6. However, in all these embodiments the central portion 6 has a hole 7 whose diameter is at least the same as that of the hole 4, and a groove 8 in which is inserted a band 9 of magnetic material such as magnetic ferrite; this band may be circular and continuous as shown in FIGS. 3 to 6, or, as shown in FIG. 8, it may be made up by discontinuous portions 10 arranged, e.g., as the side of a square, as shown in the figure. Instead of the groove 8 and the band of magnetic material it would be possible to include magnetic powder in the material of which the part 5 is made, which may be injected plastic or ABS, thus forming a magnetic zone having a development similar to the one shown in FIGS. 3 to 6 and 8.

Preferably, the peripheric portions are radial extensions 11 having a free end, as shown in FIGS. 3 and 4, or they may be connected by an annular zone 12 limiting the perimeter of the part as shown in FIGS. 5 and 6.

Over the radial extension are arranged, on both sides, rubber bands 13 which may cover them partially or completely as shown in FIGS. 4 and 5, 6, respectively, so that the faces of the records enter into direct engagement with them.

Without departing from the scope of this invention, the rubber may be placed by any other elastic material that does not attack the surface of the records, e.g. foamed polyurethane or the like, as well as resilient points in relief.

Figure 7:
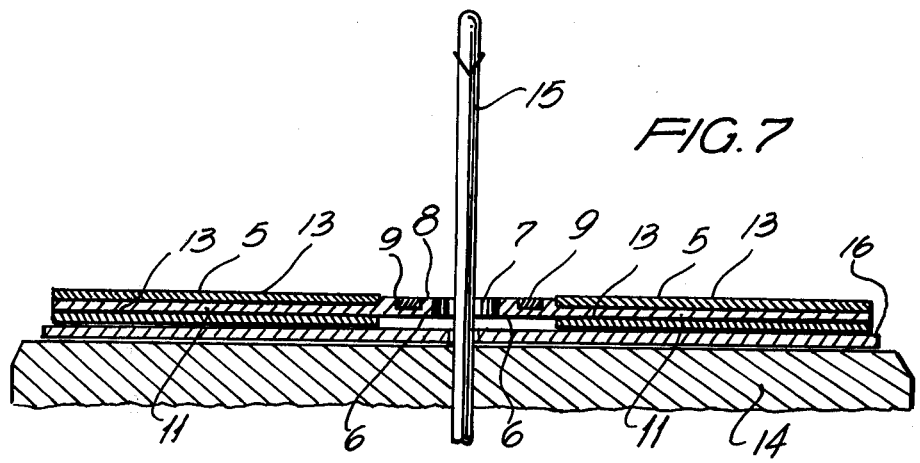
FIG. 7 is a sectional view of the part shown in FIGS. 2 to 6.

FIG. 7 shows the turntable of a record changer whose spindle 15 passes through the central hole of a record 16, and shows the position which, relative to this record, is taken by the part 5 when a second record (not shown) is lowered for playing as shown in FIG. 10, from the position shown in FIG. 9.

Thus, the device of this invention prevents dust and soil from being transferred from the lower face of the upper record to the upper face of the lower record, which dust and soil, when accumulating between the records, would promote the sliding between them, and this sliding must be avoided if fidelity of sound is to be maintained. Furthermore, said sliding would charge the records with static electricity which in turn would attract more dust and soil. At the same time, the device of the invention compensates for eventual imperfections of the surface of the records which, when stacked, would cause distorsion and wow and flutter in the upper records of the stack.

What I claim is:

1. Separators for spacing records making up a stack of records, comprising a plurality of thin metal plates each provided with a central hole whose diameter is larger than the diameter of the central hole of the records and having a self-acting adhesive on one of its faces, said plates being adhesively attachable to at least one of the faces of each record in the central zone of the latter; and a plurality of parts constituted by a central portion having a hole whose diameter is at least as great as the diameter of the central hole of the plate, a magnetic zone surrounding said hole, and peripheral portions defining elastic zones that extend over the surface of said parts.

2. Separators as claimed in claim 1, characterized in that the magnetic zone is constituted by a groove made in the part around the hole, in which groove is inserted a band of magnetic material.

3. Separators as claimed in claim 2, characterized in that the groove is circular and continuous.

4. Separators as claimed in claim 2, characterized in that the groove is discontinuous with straight runs arranged according to the sides of a square.

5. Separators as claimed in claim 1, characterized in that the peripheric portions of the parts are formed like radial extensions each of whose faces is at least partically covered with a band of softly-textured elastic material.

6. A separator for spacing records in a stack, comprising a thin metal plate provided with a central hole whose diameter is larger than the diameter of the central holes of the records and having a self-acting adhesive on one of its faces, said plate being adhesively attachable at its said one face to one of the faces of a record in the central zone thereof; and a part constituted by a central portion having a hole whose diameter is at least as great as the diameter of the central hole of the plate, a magnetic zone surrounding said hole, and peripheral portions defining elastic zones that extend over a surface of said part.

7. A separator as claimed in claim 6, in combination with a record, said plate being adhesively attached at its said one face to one of the faces of the record in the central zone thereof, and said part being magnetically adhered to said metal plate with the hole in its central portion positioned to allow a spindle to pass freely through the central hole of the record and with the elastic zones defined by said peripheral portions being directed away from the record.

* * * * *